United States Patent Office 3,093,666
Patented June 11, 1963

---

3,093,666
ISOTHIOURONIUM COMPOUNDS
Paul Du Brow, Chicago, Ill., assignor, by mesne assignments to Armour and Company, Chicago, Ill., a corporation of Delaware
No Drawing. Filed Apr. 1, 1957, Ser. No. 649,627
4 Claims. (Cl. 260—404.5)

This invention relates to high molecular weight isothiouronium compounds. In one of its aspects this invention relates to a process for inhibiting corrosion to metallic surfaces employing high molecular weight isothiouronium compounds. In another of its aspects this invention relates to a process for separating mineral ores employing high molecular weight isothiouronium compounds as flotation agents. In still another of its aspects this invention relates to insecticidal compositions containing as the essential active ingredient a high molecular weight isothiouronium compound.

The novel and versatile isothiouronium compounds of the present invention can be represented by the general formula

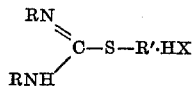

wherein X is a halogen or $R'SO_4^-$ radical, R' is a short chain alkyl hydrocarbon radical having from 1 to 5 carbon atoms, and R is a radical selected from the group consisting of alkyl and alkenyl hydrocarbon radicals having from 8 to 22 carbon atoms and a radical, quaternary in nature, having the formula

wherein R' and X are as hereinabove defined, R" is an alkyl or an alkenyl hydrocarbon radical having from 8 to 22 atoms, and $n$ is an integer of from 2 to 10. In general these compounds exhibit varying water solubility depending upon the nature of the radical substituents, and are solids or viscous liquids, usually soluble in polar and non-polar organic solvents.

The isothiouronium compounds of this invention are produced, generally, by first reacting a long chain amine or long chain aliphatic alkylene diamine with carbon disulfide to form a thiourea type of compound which is then alkylated with an alkyl halide, sulfate or halohydrin. In the case of a primary long chain amine these reactions proceed according to the following equations:

(A)

$$2RNH_2 + CS_2 \longrightarrow RHN\overset{S}{\overset{\|}{C}}NHR + H_2S\uparrow$$

(B)

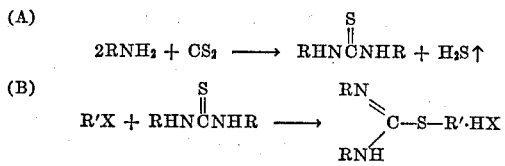

In the above equations R represents long chain alkyl and alkenyl hydrocarbon radical having from 8 to 22 carbon atoms, R' is a short chain alkyl hydrocarbon group, and X is a halogen or $R'SO_4^-$ radical. Examples of alkylating agents which can be employed include methyl chloride, dimethyl sulfate, ethyl chloride, diethyl sulfate, propyl chloride, isopropyl chloride, butyl chloride, isobutyl chloride and amyl chloride. The preferred alklating agent is methyl chloride. The long chain alkyl and alkenyl hydrocarbon radicals coming within the definition of R can be saturated or unsaturated and include octyl, decyl, dodecyl, tetradecyl, hexadecyl, octadecyl, octadecenyl, octadecadienyl, octadecatrienyl, eicosyl, docosyl and mixtures of the foregoing radicals as are contained in naturally occurring glycerides such as tallow, soybean oil, coconut oil, tall oil, and the like. For example, tallow contains a mixture comprising approximately by weight 45% octadecenyl, 30% octadecyl and 25% hexadecyl radicals; soybean oil contains a mixture comprising approximately by weight 37% octadecadienyl, 26% octadecenyl, 17% octadecyl and 20% hexadecyl radicals; coconut oil contains a mixture comprising approximately by weight 5% octadecenyl, 5% octadecyl, 8% hexadecyl, 18% tetradecyl, 47% dodecyl, 9% decyl and 8% octyl radicals.

The alkylation reaction can be carried out in the usual manner, as for example, in a bomb at a temperature in the range of 70 to 150° C. for a period sufficient to complete the reaction, viz., ½ to 6 hours. A longer period may be necessary with a less reactive alkylating agent. An excess of alkylating agent is employed. Also, the reaction can be carried out in the presence of a solvent, preferably an inert solvent.

The preparation of the intermediate N,N'-dialkyl or dialkenyl thiourea is effected by adding the carbon disulfide dropwise to the melted primary amine. The reaction is exothermic and the mixture is kept at about 120° C. for from 2 to 4 hours. If desired, the reaction can be carried out in a solvent, preferably inert. A trace of alkali can also be employed toward the end of the reaction to speed its completion.

The reactions involving a long chain aliphatic alkylene diamine proceed in the same manner and under the same general conditions as described hereinabove for the primary amines. However, in order to prevent polymerization in the production of the intermediate thiourea derivative, the secondary amine group in the aliphatic alkylene diamine is first methylated. The most practical way to do this is in the initial production of the diamine. The diamines are therefore, prepared by reactions illustrated as follows:

(C)  $RNH_2 + CH_2=CH(CH_2)_yCN$
$$\rightarrow RNH(CH_2)_{y+2}CN$$

(D)  $RNH(CH_2)_{y+2}CN + HCOOH + HCHO$
$$\rightarrow R(CH_3)N(CH_2)_{y+2}CN + CO_2 + H_2O$$

(E)  $R(CH_3)N(CH_2)_{y+2}CN + 2H_2$
$$\rightarrow R(CH_3)N(CH_2)_{y+3}NH_2$$

In the above equations R is a long chain alkyl or alkenyl group having from 8 to 22 carbon atoms as herein before defined, and y is an integer of from 0 to 7. The preferred alkene nitrile is acrylonitrile ($y=0$). Reaction C proceeds at the refluxing temperature of the nitrile, preferably, but can be carried out at temperatures varying from 20 to 160° C. It is better to conduct the reaction at temperatures below the decomposition temperature of the reaction components. The reaction is generally complete in about 4 hours. Reaction D is completed by first heating for 3 to 4 hours and then refluxing the mixture for about a half hour. The hydrogenation reaction (E) is carried out in the presence of a Raney nickel catalyst at a temperature in the range of 80 to 160° C. for a period of about 1 to 6 hours.

Since in the resulting compound only one amine group is available for reaction with carbon disulfide, the formation of the isothiouronium compound proceeds according to the following equations:

(F)
$2R(CH_3)N(CH_2)_nNH_2 + CS_2 \longrightarrow$

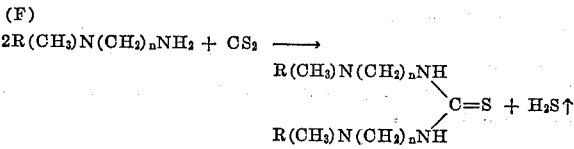

(G)

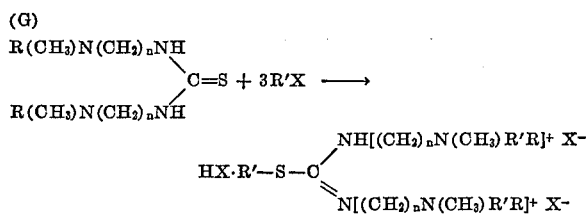

An excess of alkylating agent is used, sufficient to alkylate the sulfur atom and quaternize the tertiary amine groups. As pointed out, reactions F and G are carried out under the same general conditions as described for reactions A and B.

The preferred compounds of my invention have the following structural formulae:

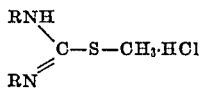

and

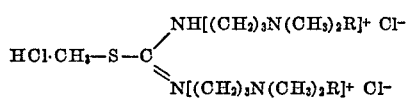

wherein R is a mixture of aliphatic hydrocarbon radicals as contained in tallow.

The isothiouronium compounds of my invention are versatile compounds and find application in the fields of ore flotation, acid corrosion inhibition and in insecticidal compositions. When used as ore flotation agents they are used in a ratio of about 0.03 to 0.5 pound per ton of ore processed. When used for inhibiting corrosion by acids to metal surfaces they are used in a concentration range of 10 to 50,000 parts per million. In the case of vapor phase corrosion inhibition, the metallic surface to be protected can be coated with a thin film of the compound, such as by "painting" the surface with a solution of the compound in an organic solvent. In insecticidal compositions my isothiouronium compounds can be employed as the essential active ingredient in a concentration range of about 3 to 10 weight percent, either as solutions in organic solvents or as emulsions or in admixture with inert diluents normally used such as pyropholite, clays, celite, etc.

The following examples will help to illustrate my invention:

Example I 450 grams of N,N'-dioctadecyl thiourea was heated and agitated in a bomb with an excess of methyl chloride for about 6 hours. The product titrated, with dilute alkali, to a molecular weight of 636. Recrystallization with acetone gave a light-colored product having a molecular weight of 628. The theoretical molecular weight for the compound

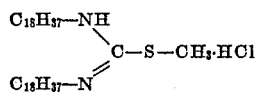

is 630°.

Example II 75.2 grams of dodecyl amine was put in a 3-necked flask and warmed to keep melted. Carbon disulfide was added dropwise letting the temperature rise to about 120° C. The temperature was kept constant until the evolution of $H_2S$ ceased. At two hours the evolution was slow, and only a trace was evident at the end of four hours. At the end of this period a pellet of sodium hydroxide was added. The N,N'-didodecylthiourea thus prepared was melted, mixed with 1500 cc. of 3A alcohol, filtered and dried.

40 grams of this material was treated with an excess of methyl chloride in a bomb at 90 to 100° C. for about 2 hours. The resulting reaction mixture was a viscous yellow liquid soluble in 3A alcohol, ethyl acetate and Skelly F. It gave a milky solution with water (slight foaming), and gave a precipitate with aqueous silver nitrate. Analysis for chlorine gave 7.24%. The theoretical percentage of chlorine for the compound

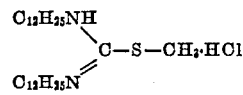

is 7.57%. A 100% yield of product was obtained.

A 1% solution of the above compound containing 1 to 2% 3A alcohol stayed in solution with a milky turbidity in evidence. In water alone, a white filterable precipitate was obtained which melted at about 50° C. but which did not solidify on cooling.

The original liquid was soluble in 3A alcohol, ethyl ether, ethyl acetate, chloroform and Skelly B at about 5° C. It precipitated out of all but chloroform at Dry Ice temperature.

Example III 228.1 grams of dodecylamine was heated for 3½ hours with 100 grams of acrylonitrile at the reflux temperature of the nitrile. The reaction mixture was then distilled giving about 250 grams $C_{12}H_{25}NHCH_2CH_2CN$. This was treated with formic acid and formaldehyde, refluxing for about ½ hour after the reaction slowed. 220 grams of distillate was obtained which titrated to a molecular weight of 251. The theoretical molecular weight for the compound $C_{12}H_{25}N(CH_3)CH_2CH_2CN$ is 252.4. This material was then reduced in a bomb with hydrogen over a Raney nickel catalyst and the mixture distilled. 194 grams, or about 85 to 90% yield, was obtained of $C_{12}H_{25}N(CH_3)(CH_2)_3NH_2$.

94.0 grams of the amine produced was put into a 3-necked flask and 13.93 grams of carbon disulfide run in slowly. The reaction mixture solidified partly and the temperature rose. The mixture was heated to 120° C. and kept there for about 6 hours. A pellet of sodium hydroxide was added at the end of about 5 hours. The mixture was then cooled and taken up in Skelly B, dried and evaporated. 102 grams of material was left which analyzed to 5.9% sulfur. The theoretical percentage of sulfur in the thiourea derivative having the formula $C_{12}H_{25}N(CH_3)(CH_2)_3NH_2CS$ is 5.77%.

47.7 grams of the thiourea compound was heated in a bomb at 90° C. for 1 hour with excess methyl chloride in about 50 cc. of acetone. At the end of this period, the mixture was taken up in a minimum quantity of ethyl acetate, and then precipitated with acetone and Skelly F. A brown insoluble product resulted which was decanted and washed with warm ethyl ether and then hot ethyl acetate. This was then dissolved in hot acetone which was then cooled. The precipitate was washed with more ethyl acetate and then dried on a steam bath to a gelatinous somewhat sticky brown colored product which analyzed to 13.6% chlorine and about 2½ quaternary groups. The product was probably a mixture of the three compounds (1)  HCl·CH₃—S—C(=N[(CH₂)₃N(CH₃)₃C₁₂H₂₅]⁺Cl⁻)(NH[(CH₂)₃N(CH₃)₃C₁₂H₂₅]⁺Cl⁻)

(2)  HCl·CH₃—S—C(=N[(CH₂)₃N(CH₃)₃C₁₂H₂₅]⁺Cl⁻)(NH(CH₂)₃N(CH₃)C₁₂H₂₅)

and (3)
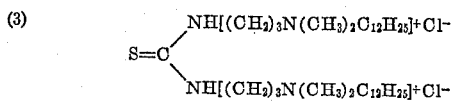

with the first compound present in the larger amount.

A sample of the mixture was analyzed for methyl amine content by dissolving in water, adding sodium hydroxide, refluxing a few minutes, then adding sulfuric acid and catching the released methyl mercaptan in lead acetate. The $Pb(SCH_3)_2$ was filtered, dried and weighed. The results corresponded to 42% isothiourea calculated as compound 1 above. The chlorine analysis indicated about 63% of this compound. It is probable however that the refluxing of the isothiourea compound released some methyl mercaptan.

This application is a continuation-in-part of my application Serial No. 425,737, filed April 26, 1954, now abandoned.

While in the foregoing description specific details have been set out for the purpose of illustrating embodiments of the invention, it will be understood that such details may be varied widely by those skilled in the art without departing from the spirit of my invention.

I claim:

1. An isothiouronium compound having the general formula

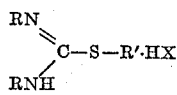

wherein X is a radical selected from the group consisting of chlorine and bromine, R' is an alkyl hydrocarbon radical having from 1 to 5 carbon atoms, and R is a radical selected from the group consisting of alkyl and alkenyl hydrocarbon radicals having from 8 to 22 carbon atoms and a radical having the formula

wherein R' and X are as hereinbefore defined, R'' is a radical selected from the group consisting of alkyl and alkenyl hydrocarbon radicals having from 8 to 22 carbon atoms, and $n$ is an integer of from 2 to 10.

2. An isothiouronium compound according to claim 1 wherein X is chlorine, R' is methyl, $n$ is 3, and R is a mixture of fatty acid radicals as contained in tallow.

3. An isothiouronium compound according to claim 1 wherein X is chlorine, R' is methyl, $n$ is 3, and R is a mixture of fatty acid radicals as contained in soybean oil.

4. An isothiouronium compound according to claim 1 wherein X is chlorine, R' is methyl, $n$ is 3, and R is a mixture of fatty acid radicals as contained in coconut oil.

References Cited in the file of this patent

UNITED STATES PATENTS

| | | |
|---|---|---|
| 2,156,193 | Puetzer | Apr. 25, 1939 |
| 2,211,280 | Martin et al. | Aug. 13, 1940 |
| 2,220,970 | Loane et al. | Nov. 12, 1940 |
| 2,238,949 | Schlack | Apr. 22, 1941 |
| 2,315,852 | Gordon et al. | Apr. 6, 1943 |
| 2,336,868 | Jayne et al. | Dec. 14, 1943 |
| 2,380,698 | Jayne et al. | July 31, 1945 |
| 2,602,760 | Michel et al. | July 8, 1952 |
| 2,607,803 | Lecher et al. | Aug. 19, 1952 |
| 2,697,727 | Kaiser et al. | Dec. 21, 1954 |
| 2,708,679 | Lo et al. | May 17, 1955 |
| 2,719,174 | Hechenbleikner | Sept. 27, 1955 |

FOREIGN PATENTS

| | | |
|---|---|---|
| 199,781 | Switzerland | Nov. 16, 1938 |

OTHER REFERENCES

Bandelin et al.: Jour. Am. Chem. Soc., vol. 74 (1952), pages 4271–73.

Grogan et al.: Jour. Org. Chem., vol. 18 (1953), pages 728–731.